US007295982B1

United States Patent
Cohen et al.

(10) Patent No.: US 7,295,982 B1
(45) Date of Patent: Nov. 13, 2007

(54) SYSTEM AND METHOD FOR AUTOMATIC VERIFICATION OF THE UNDERSTANDABILITY OF SPEECH

(75) Inventors: Harvey S. Cohen, Middletown, NJ (US); Randy G. Goldberg, Holmdel, NJ (US); Kenneth H. Rosen, Middletown, NJ (US)

(73) Assignee: AT&T Corp., New York, NY (US)

( * ) Notice: Subject to any disclaimer, the term of this patent is extended or adjusted under 35 U.S.C. 154(b) by 1435 days.

(21) Appl. No.: 09/992,988

(22) Filed: Nov. 19, 2001

(51) Int. Cl.
*G10L 21/00* (2006.01)

(52) U.S. Cl. ............... 704/270; 704/226; 704/208

(58) Field of Classification Search ............ 704/225, 704/226, 214, 215, 208–210, 236, 207, 270, 704/270.1
See application file for complete search history.

(56) References Cited

U.S. PATENT DOCUMENTS

| | | | |
|---|---|---|---|
| 5,119,087 A | 6/1992 | Lucas | 340/825.35 |
| 5,524,279 A | 6/1996 | Keba et al. | 455/52.1 |
| 5,640,485 A | 6/1997 | Ranta | 395/2.6 |
| 5,649,057 A | 7/1997 | Lee et al. | 395/2.65 |
| 5,659,597 A | 8/1997 | Bareis et al. | 455/563 |
| 5,684,921 A * | 11/1997 | Bayya et al. | 704/226 |
| 5,719,921 A | 2/1998 | Vysotsky et al. | 379/88 |
| 5,732,388 A | 3/1998 | Hoege et al. | 704/205 |
| 5,774,858 A | 6/1998 | Taubkin et al. | 704/273 |
| 5,826,233 A | 10/1998 | Matsumoto | 704/275 |
| 5,832,063 A | 11/1998 | Vysotsky et al. | 379/88 |
| 5,889,224 A | 3/1999 | Tanaka | 84/645 |
| 5,953,692 A | 9/1999 | Siegel | 704/1 |
| 6,035,017 A | 3/2000 | Fenton et al. | 379/88.04 |
| 6,067,516 A | 5/2000 | Levay et al. | 704/244 |
| 6,069,940 A | 5/2000 | Carleton et al. | 379/88.04 |
| 6,073,094 A | 6/2000 | Chang et al. | 704/223 |
| 6,076,073 A | 6/2000 | Pieterse et al. | 705/39 |
| 6,122,361 A | 9/2000 | Gupta | 379/223 |
| 6,249,760 B1 * | 6/2001 | Bossemeyer, Jr. | 704/225 |
| 6,477,492 B1 * | 11/2002 | Connor | 704/236 |

* cited by examiner

*Primary Examiner*—Richmond Dorvil
*Assistant Examiner*—Huyen X. Vo (57) ABSTRACT

The present invention relates to a system and method for automatically verifying that a message received from a user is intelligible. In an exemplary embodiment, a message is received from the user. A speech level of the user's message may be measured and compared to a pre-determined speech level threshold to determine whether the measured speech level is below the pre-determined speech level threshold. A signal-to-noise ratio of the user's message may be measured and compared to a pre-determined signal-to-noise ratio threshold to determine whether the measured signal-to-noise ratio of the message is below the pre-determined signal-to-noise ratio threshold. An estimate of intelligibility for the user's message may be calculated and compared to an intelligibility threshold to determine whether the calculated estimate of intelligibility is below the intelligibility threshold. If any of the measured speech level, measured signal-to-noise ratio and calculated estimate of intelligibility of the user's message are determined to be below their respective thresholds, the user may be prompted to repeat at least a portion of the message.

23 Claims, 4 Drawing Sheets

SYSTEM AND METHOD FOR AUTOMATIC VERIFICATION OF THE UNDERSTANDABILITY OF SPEECH

TECHNICAL FIELD

The present invention relates to the field of communications. More specifically, the present invention relates to a speech verification system to verify the intelligibility of a user's message in real time.

BACKGROUND OF THE INVENTION

Automated voice messaging systems are known in the art and used extensively for rapid and convenient communication. The recording of telephone voice messages is a convenience to both the calling and called parties. The caller may leave a message for the called party during off-hours, or when the called party is unable to answer the call. The called party may be a person or may be a machine or system such as an automatic voice recognition system or a voice message system. The call may occur over traditional telephone exchange lines, a switched network, a mobile-based network, the Internet, and the like. The called party may retrieve the stored message when desired. The caller's message is delivered to the called party and the information within the message is not lost. One problem with this process is, however, inaudible or unintelligible voice messages.

Callers attempt to speak clearly and audibly, but voice messages may include voice content that is difficult to understand or is subjected to noise levels that make comprehension difficult. The called party may directly listen to the message or the message may be processed through, for example, a voice recognition system. Further, messages may be converted to text or stored for archival purposes. All of these actions require that the person or system receiving the message understand the information within the message.

Partially unintelligible messages can be inconvenient to the called party, especially if names or numbers are inaudible. The called party may lose the information within the message and the caller is typically unaware that the message was not understood or processed. If the identity of the caller is unknown or unintelligible, the called party may not have any recourse in resolving the information or content of the message. In other words, neither the caller nor the called party may take any action that is efficient or on a real time basis when an incomprehensible message is left.

SUMMARY OF THE INVENTION

The present invention relates to a system and method for automatically verifying that a message received from a user is intelligible. In an exemplary embodiment, a message is received from the user. A speech level of the user's message may be measured and compared to a pre-determined speech level threshold to determine whether the measured speech level is below the pre-determined speech level threshold. A signal-to-noise ratio of the user's message may be measured and compared to a pre-determined signal-to-noise ratio threshold to determine whether the measured signal-to-noise ratio of the message is below the pre-determined signal-to-noise ratio threshold. An estimate of intelligibility for the user's message may be calculated and compared to an intelligibility threshold to determine whether the calculated estimate of intelligibility is below the intelligibility threshold. If any of the measured speech level, measured signal-to-noise ratio and calculated estimate of intelligibility of the user's message are determined to be below their respective thresholds, the user may be prompted to repeat at least a portion of the message.

BRIEF DESCRIPTION OF THE DRAWINGS

Embodiments of the present invention are illustrated by way of example, and not limitation, in the accompanying figures in which like references denote similar elements, and in which.

DETAILED DESCRIPTION

Figure 1:
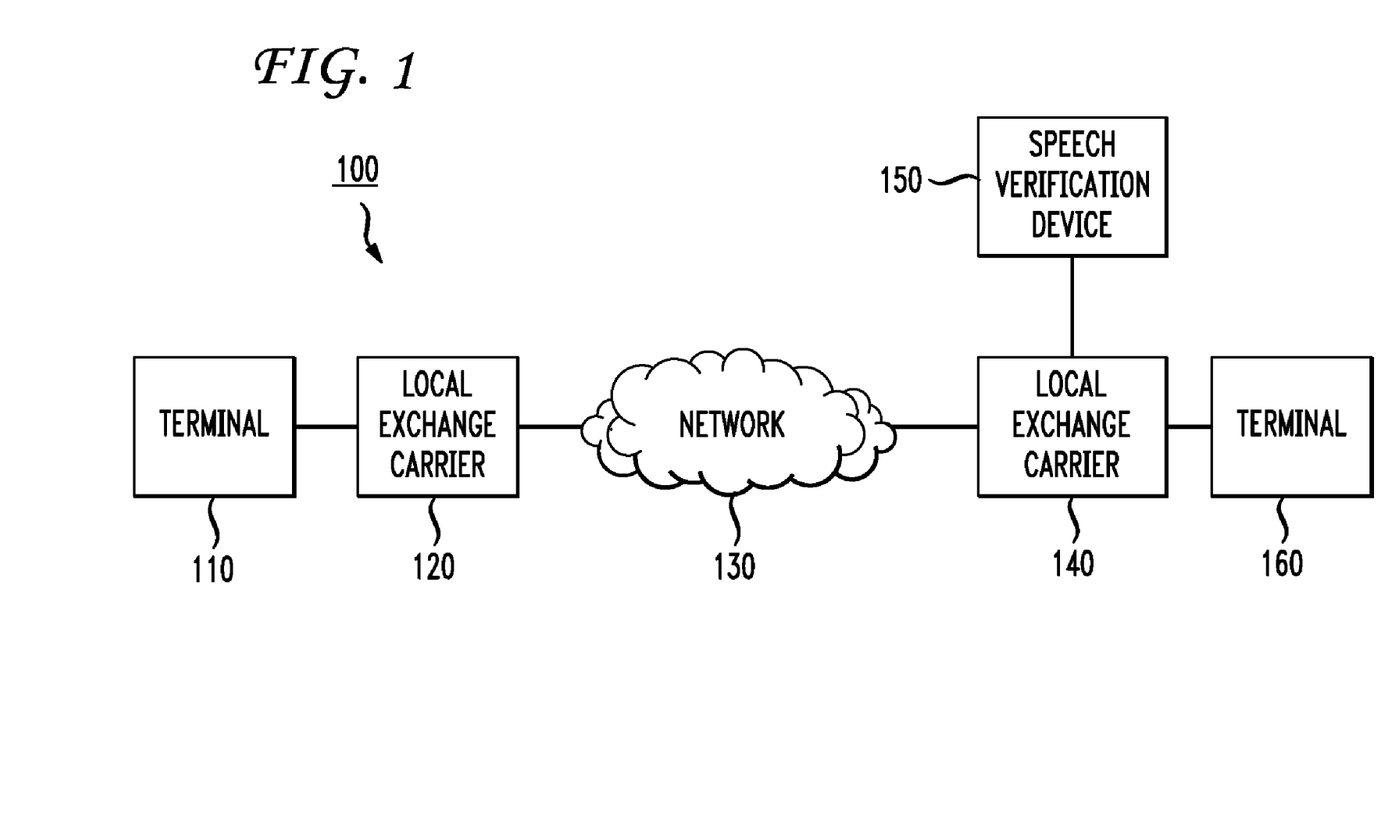
FIG. 1 is a block diagram of a speech verification system in accordance with an embodiment of the present invention.

FIG. 1 is a block diagram of a speech verification system 100 according to an exemplary embodiment of the present invention. The speech verification system 100 may include an automatic speech verification device (SVD) 150 in accordance with an embodiment of the present invention.

The SVD 150 may monitor, in real time, a message received from a user for various characteristics of the users message to verify that the message will be sufficiently intelligible when played back and/or processed by a human and/or a machine. For example, the SVD 150 may determine whether there is sufficient level of speech energy in the message such that the message is potentially intelligible. SVD 150 may also determine whether the signal-to-noise ratio of the user's message is sufficient such that the message is intelligible.

In embodiments of the present invention, the SVD 150 may further employ other or additional techniques to verify that the message is intelligible. For example, the SVD may establish an estimate of intelligibility for the entire message or a portion of the user's message. In embodiments of the present invention, the SVD 150 may establish the estimate of intelligibility based on recognizable or identifiable phonemes. The SVD 150 may recognize phonemes in the user's message to verify that the message contains a normal phoneme distribution for a given language such that the message may be recognizable. If the SVD 150 determines that the message does not contain phonemes from an expected language, the SVD 150 may determine that the user's message is unintelligible. Alternatively, if the SVD 150 determines that the spoken message does not contain phonemes from an expected language, the SVD 150 may attempt to determine whether the spoken message is in another language. The SVD 150 may employ an extended set of phonemes to determine whether the spoken message is potentially intelligible in the other language.

In alternative embodiments of the present invention, the SVD may use grammars and/or word spotting techniques to verify that important and/or critical information—for example, names, bank account numbers, credit card numbers, telephone numbers, etc.—included in the user's message will be intelligible when played back and/or processed by a human and/or a machine. The estimate of intelligibility may indicate the degree to which the recognized important information is intelligible.

In further alternative embodiments of the present invention, the SVD 150 may employ context-specific or domain-specific libraries or databases to verify that the message contains words that match with the vocabulary words included in the domain-specific libraries. The SVD may establish an estimate of intelligibility based on—for example—the numbers of words included in the user's message that appear in the vocabulary of the domain-specific libraries. If a certain number of words included in the message do not appear in the database, the SVD 150 may determine that the entire message or a portion of the message is unintelligible.

In the above examples, if the speech level of the user's message, the signal-to-noise ratio of the user's message and/or an established estimate of intelligibility is below a predetermined probability threshold, the SVD 150 may determine that the entire message or a portion of the message is unintelligible. The SVD 150 may prompt the user to repeat either the entire message or the portion of the message that is determined to be unintelligible. In other words, the system may specify how much speech the user may need to repeat. Additionally or optionally, the system may specify how the repeated speech should be spoken. For example, based on the characteristics of the speech that may have caused the message to be possibly unintelligible, the SVD may request that the user's message be repeated with, for example, a higher volume, a slower speed, with the background noise eliminated, etc. SVD 150 may make such requests to repeat either after the entire message including the unintelligible portion has been received or immediately after recognizing the unintelligible portion of the message.

Referring again to FIG. 1, speech verification system 100 shows a terminal device 110 that may be a calling party's terminal device. The terminal device 110 can communicate with an originating communication switch (not shown) that may be located within a local exchange carrier's central office 120 (hereinafter referred to as originating-side local exchange carrier (LEC) 120). The LEC 120 is typically connected to a transit network 130. Another terminal device 160, for example, a called party's terminal device, can communicate with a terminating communication switch (not shown). The terminating communication switch may be located within, for example, a local exchange carrier's central office 140 (hereinafter referred to as terminating-side LEC 140) that may also be connected to transit network 130. In embodiments of the present invention, the terminating-side LEC 140 may be further coupled to the SVD 150.

Although the SVD 150 is shown connected to the terminating-side LEC 140, it is recognized that the SVD 150 may be connected to originating-side LEC 120. The SVD 150 may be located within the LECs (e.g., 120, 140) or may be located external to the LECs.

Terminal devices 110, 160 can be any of a variety of communication devices such as wired or wireless telephones, one way or two-way pagers, Personal Digital Assistants (PDAs), personal computers (PC), a Voice Recognition System, a Voice Response Unit (VRU), an Interactive Voice Response Unit (IVRU), a paging unit, intelligent switches, private branch exchanges (PBX), or any other devices used for and/or in communications.

In alternative embodiments of the present invention, SVD 150 may be externally coupled to or located within terminal devices 110, 160.

Terminal device 110 (also referred to herein as user device 110) may communicate with terminal device 160 (also referred to herein user device 160) through LEC 120, transit network 130, and LEC 140.

Although SVD 150, as shown in FIG. 1, is configured in a telecommunications system, it is recognized that embodiments of the SVD 150 as described herein can be incorporated into any device or system that receives audio messages from users. For example, the SVD 150 or a similarly configured device may be incorporated within a dictation machine, a personal computer, a PDA, an IVR, a phone, voice messaging system, a tape recorder, or other suitable device or system that can record or store user messages. The SVD 150 may verify that an intelligible message is received or recorded in real time. If the SVD 150 determines that any portion of the message is unintelligible, the SVD 150 may automatically request that the user repeat the entire message or the portion of the message that is determined to be unintelligible.

LEC 120 and LEC 140 may be central offices or switching centers of local phone companies that receive and deliver calls. In the example illustrated in FIG. 1, LEC 120 may receive, for example, a call from terminal device 110. The call may be routed via the transit network 130 to LEC 140. LEC 140 may route the call to the called party's terminal device 160. In embodiments of the present invention, speech verification as provided by the SVD 150 may be a feature or service that is provided by the local phone companies. If the calling party and/or the called party is a subscriber of the speech verification service or feature, one of the LECs may process the call using the speech verification technique employed by the SVD 150 as discussed herein.

LEC 120 and/or LEC 140 may contain originating and/or terminating communication switches (not shown) that may include a processor, computer readable memory, a data port, a network port and a data bus (all not shown). The data port permits communications with devices such as the terminal devices 110, 160 and/or the SVD 150. As indicated above, the SVD 150 or similarly configured device may be configured external to or internal to such originating and/or terminating communication switches. The network port of the communication switches can be connected to transit network 130. The data bus located within the originating and/or terminating communications switch connects the processor, the computer readable memory, the data port and the network port and permits communication between the various components of the switch.

Communication switches located with the LECs 120, 140 may operate special software to perform functions associated with toll calls and/or local calls. Originating and/or terminating communication switches that may be located within LECs 120, 140 may contain a dual tone modulated frequency (DTMF) detection unit to receive the DTMF signals. Alternatively, the communication switches may contain a VRU or an IVRU to recognize and/or process voice responses. The 4ESS® and 5ESS® switches manufactured by Lucent Technologies, Inc. of Murray Hill, N.J. are examples of the hardware that can perform the functions of communications switches that may be used by LECs.

In embodiments of the present invention, communication switches may be Mobile Telephone Switching Office (MTSO) switches to handle calls from mobile telephones. As used herein, MTSO switch refers generally to any type of switch that can handle analog, cellular, digital or personal communication services (PCS) calls.

Note that while FIG. 1 merely shows LECs 120, 140 coupled to the transit network 130, additional LECs including additional switches may also be coupled to the transit network 130.

Transit network 130 may be a communications network that may include, for example, a public switched telephone network (PSTN), an Integrated Services Digital Network (ISDN), a cellular network, a digital mobile network, a Personal Communication Systems (PCS) network, an Internet, an intranet, a signaling system 7 (SS7) network, a local area network (LAN), a satellite network, an advanced intelligent network (AIN), any suitable digital or analog network, a broadband network such as a cable network, any other suitable national and/or international communications network or any suitable combination thereof.

Although FIG. 1 only shows terminal devices 110, 160 connected to the LECs 120, 140, respectively, of course any number of additional terminal devices may be connected to the transit network 130.

Figure 2:
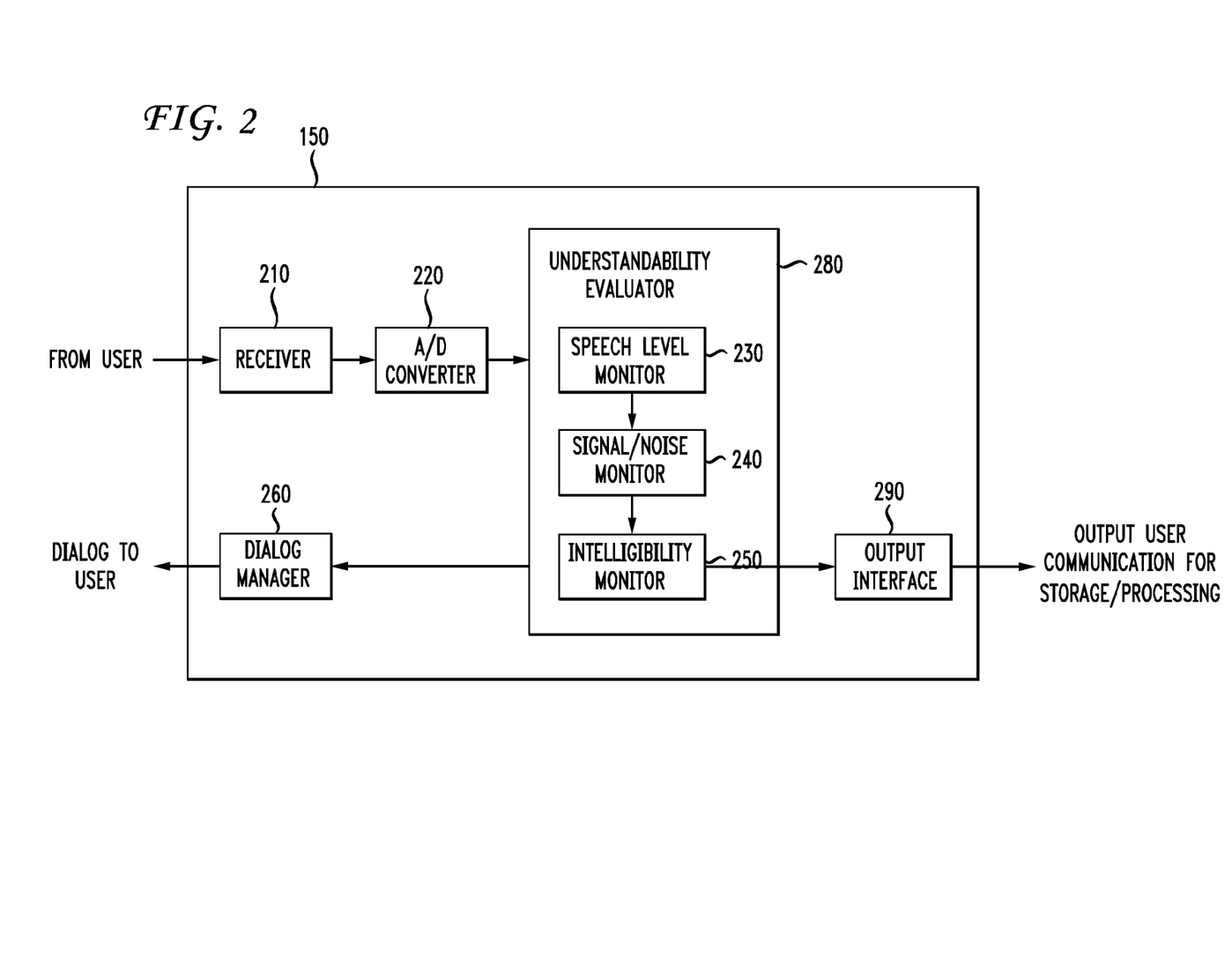
FIG. 2 illustrates a block diagram of a speech verification device in accordance with an embodiment of the present invention.

FIG. 2 is a block diagram of SVD 150 that may contain intelligence to monitor, in real time, an incoming message from a user and to verify that message is intelligible. The SVD 150 may be a stand-alone device or, as indicated above, the SVD 150 may be coupled external to or incorporated within the user's terminal device. It is recognized that any suitable hardware and/or software may be used by one of ordinary skill in the art to configure and/or implement an SVD in accordance with embodiments of the present invention.

The SVD 150 may include a receiver 210 that receives audio or speech messages from users. For example, the receiver 210 may be a network interface that interfaces with a switch located in the LEC or other type of interface that can receive the user's messages. In embodiments of the present invention, the receiver 210 may support a coaxial interface, twisted pair interface, optical interface, wireless interface and/or any other interface to permit the receiver 210 to receive messages. In alternative embodiments of the present invention, the receiver 210 may be a microphone or other device that can receive, for example, audio messages from users.

Embodiments of the present invention may further include an analog-to-digital converter 220 (A/D converter). The A/D converter 220 may receive a user's message that may be represented as an analog signal from the receiver 210. The AND converter 220 can convert the analog message to a digitized signal. The digitized signal may be processed in accordance with embodiments of the present invention to verify that the user's message represented by the digitized signal is intelligible. It is recognized that the A/D converter 220 can be omitted if the message is received in a digital format at the receiver 210. In alternative embodiments of the present invention, some processing—such as determining the speech level or determining the intelligibility of the message—may be done directly using the analog signal. In this case, the receiver 210 may pass the analog message signal directly to the understandability evaluator 280 for processing.

In embodiments of the present invention, the user's message may be forwarded to an understandability evaluator 280 that may evaluate the message for understandability and/or may determine the intelligibility level of the message. The understandability evaluator 280 may look at various characteristics of the user's message to evaluate whether the user's message will be sufficiently intelligible or understandable. The understandability evaluator 280 may include, for example, a speech level monitor 230, a signal-to-noise ratio monitor 240 and/or an intelligibility monitor 250.

The understandability evaluator 280 may be coupled to dialog manager 260 that may manage a dialog with the user if the user's message is determined not to be sufficiently intelligible by the understandability evaluator 280. The understandability evaluator 280 may be further coupled to an output interface 290 that may output the user's communication for storage and/or processing, if the user's message is determined to be sufficiently intelligible by the understandability evaluator 280.

In embodiments of the present invention, the speech level monitor 230 measures the speech level of the user's message. The speech level is typically defined as the speech signal power or intensity that may be measured over a portion of the speech, such as a phrase or sentence. The speech level monitor 230 may be configured with a pre-determined speech level threshold that may indicate the minimum intensity of the speech signal that may be desirable for the speech to be sufficiently intelligible. Any speech level above the threshold may be considered potentially intelligible and any speech below the threshold may be considered unintelligible. The speech level threshold may be a variable or fixed value that is typically measured in decibels as referenced to 1 milliwatt (dBm). The speech level threshold may be varied or adjusted by an operator of the SVD 150 as desired.

The speech level monitor 230 may compare the measured speech level of the user's message with the pre-determined speech level threshold to determine whether the speech level of the user's message is above or below the pre-determined threshold. If the speech level of the user's message is above the pre-determined speech level threshold, the user's message may be considered potentially intelligible and may be forwarded to the output interface 290 for storage and/or processing. However, if the speech level of the user's message is below the pre-determined speech level threshold, the understandability monitor 280 may consider this characteristic of the user's message alone and/or may consider this characteristic in combination with other characteristics to determine whether the user's message should be considered unintelligible.

If the understandability monitor 280 determines that the user's message is unintelligible based on the measured speech level, the dialog manager 260 may begin a dialog with the user to repeat the entire message or a portion of the message. After the user repeats the message, the understandability monitor 280 reevaluates the repeated message to determine intelligibility.

In embodiments of the present invention, the SVD 150 may include a signal-to-noise monitor 240 that measures the signal-to-noise ratio of the user's message. Typically, the signal-to-noise ratio is defined as the ratio of the usable signal being transmitted or received to the noise or undesirable signal. The signal-to-noise monitor 240 may be configured with a pre-determined signal-to-noise ratio threshold that may indicate the minimum signal-to-noise ratio that may be desirable for the speech to be sufficiently intelligible. Any signal representing the user's message above the signal-to-noise ratio threshold may be considered potentially intelligible and any signal below the threshold may be considered potentially unintelligible. The signal-to-noise ratio threshold may be a variable or fixed value that is typically measured in decibels (dB). The signal-to-noise ratio threshold may be varied or adjusted by an operator of the SVD 150 as desired.

The signal-to-noise monitor 240 may compare the measured signal-to-noise ratio of the user's message with the pre-determined signal-to-noise ratio threshold to determine whether the speech signal representing the user's message is above or below the pre-determined signal-to-noise ratio threshold. If the speech signal representing the user's message is above the pre-determined signal-to-noise ratio threshold, the user's message may be considered potentially intelligible and may be forwarded to the output interface 290 for storage and/or processing. However, if the speech signal representing the user's message is below the pre-determined signal-to-noise ratio threshold, the understandability monitor 280 may consider this characteristic of the user's message alone and/or may consider this characteristic with other characteristics to determine whether the user's message should be considered unintelligible.

If the understandability monitor 280 determines that the user's message is unintelligible based on the measured signal-to-noise ratio, the dialog manager 260 may begin a dialog with the user to repeat the entire message or a portion of the message. After the user repeats the message, the understandability monitor 280 reevaluates the repeated message to determine intelligibility.

In embodiments of the present invention, the intelligibility monitor 250 may further calculate an estimate of intelligibility based on the user's message. In embodiments of the present invention, the estimate of intelligibility may be calculated based on, for example, the number of identifiable phonemes included in the user's message, the intelligibility of critical words or information detected in the user's message and/or the number of words detected in the user's message that are contained in a domain library. It is recognized that other parameters may be used to calculate the estimate of intelligibility. For example, natural language understanding techniques may be used to calculate the estimate of intelligibility.

In embodiments of the present invention, the estimate of intelligibility based on phonemes may be calculated first, followed by the estimate of intelligibility based on the critical words, which may be followed by the estimate of intelligibility based on the number of words contained in the domain library. Alternatively, the estimates of intelligibility may be calculated in any other order.

In embodiments of the present invention, the estimate of intelligibility can be computed by determining whether probabilities calculated by the recognizer fall below their respective intelligibility threshold levels. For example, the estimate of intelligibility calculated based on phonemes may be compared to a phoneme estimate of intelligibility threshold. The intelligibility monitor 250 may be configured with one or more such intelligibility thresholds that may indicate the minimum intelligibility level that may be desirable for the speech to be sufficiently intelligible. Thus, any message or a portion thereof from the user having a calculated estimate of intelligibility above its corresponding intelligibility threshold may be considered potentially intelligible. Conversely, any message or a portion thereof from the user having a calculated estimate of intelligibility below its respective intelligibility threshold may be considered unintelligible. The intelligibility threshold may be a fixed or variable value that may be varied or adjusted by an operator of the SVD 150 as desired. The intelligibility monitor 250 may establish an estimate of intelligibility and/or an overall estimate of intelligibility for the entire or for a portion of the user's message.

In alternate embodiments of the present invention, one or more individual estimates of intelligibility (e.g., for phonemes, for critical words, for domain-based words, etc.) may be used to determine an overall estimate of intelligibility for the user's message. The overall estimate of intelligibility may be compared with respective overall intelligibility thresholds. Thus, any message or a portion thereof from the user having an overall estimate of intelligibility above its corresponding overall intelligibility threshold may be considered potentially intelligible, while any message or a portion thereof from the user having an overall estimate of intelligibility below its respective overall intelligibility threshold may be considered unintelligible.

In an embodiment of the present invention, the intelligibility monitor 250 may establish the estimate of intelligibility based on recognizable or identifiable phonemes in the user's message. The intelligibility monitor 250 may verify that the user's message contains a normal phoneme distribution so that the message is potentially intelligible. A phoneme is typically the smallest phonetic unit in a language capable of conveying a distinction in meaning. There are approximately 64 total phonemes for all human languages. The English language contains approximately 48 of the total 64 phonemes. The intelligibility monitor 250 may contain a recognizer (not shown) that may determine that phonemes contained in the user's message do not correspond to those from English, possibly indicating that the message is unintelligible.

In embodiments of the present invention, the intelligibility monitor 250 may attempt to recognize the most likely phoneme or phonemes from the complete set of phonemes that are expected from a particular language. The intelligibility monitor 250 may calculate a phoneme estimate of intelligibility based on the recognizable phoneme distribution for the expected language, such as English. The intelligibility monitor 250 may compare the calculated phoneme estimate of intelligibility with an estimate of intelligibility threshold for phonemes. If the calculated phoneme estimate of intelligibility is lower than the corresponding threshold for phonemes, this may indicate that the intelligibility monitor 250 is consistently having trouble determining which phoneme or phonemes in, for example, the English language are being spoken. Accordingly, the intelligibility monitor 250 may conclude that the user's message is unintelligible based on the phoneme calculation.

In alternative embodiments of the present invention, if the intelligibility monitor is unable to recognize phonemes contained in the English language, the intelligibility monitor may conclude that the most likely phonemes being spoken by the user are from a language other than English (e.g., Spanish, French, German, Hindi, etc.). In this case, the intelligibility monitor may employ an extended set of phonemes (e.g., including those phonemes that are not usually found in the English language). By analyzing the phoneme distribution based on the extended set of phonemes, the intelligibility monitor 250 may determine which language may be spoken by the user and then may consider the normal phoneme distribution for that language. After the intelligibility monitor 250 determines the language spoken by the user, it may know which phonemes to look for as well as which words to look for. The intelligibility monitor 250 may calculate a phoneme estimate of intelligibility based on the extended set of phonemes. The intelligibility monitor 250 may compare the calculated phoneme estimate of intelligibility based on the extended set of phonemes with a corresponding estimate of intelligibility threshold. If the calculated phoneme estimate of intelligibility is lower than the corresponding threshold, the intelligibility monitor 250 may conclude that the user's message is unintelligible based on this extended phoneme calculation.

After phonemes are recognized, the intelligibility monitor 250 may attempt to determine the actual words being spoken by the user. In an embodiment of the present invention, the intelligibility monitor 250 may recognize the words being spoken by combining the recognized phonemes together and trying to parse the results into recognizable words. If the intelligibility monitor is unable to recognize the words or if the recognized words do not form sentences that seem to make sense (e.g., using known natural language understanding technology), then the speech can be considered potentially unintelligible. The intelligibility monitor may employ pre-determined thresholds to determine whether the words are recognizable and/or to determine whether the sentences formed by the words seem sensible.

If the calculated estimate of intelligibility based on recognizable phonemes is above the intelligibility threshold for phonemes, the user's message may be considered potentially intelligible and may be forwarded to the output interface 290 for storage and/or processing. However, if the calculated estimate of intelligibility based on recognizable phonemes is below the intelligibility threshold for phonemes, the dialog manager 260 may begin a dialog with the user to repeat the entire message or a portion of the message. After the user repeats the message, the understandability monitor 280 may reevaluate the repeated message to determine intelligibility.

Figure 4:
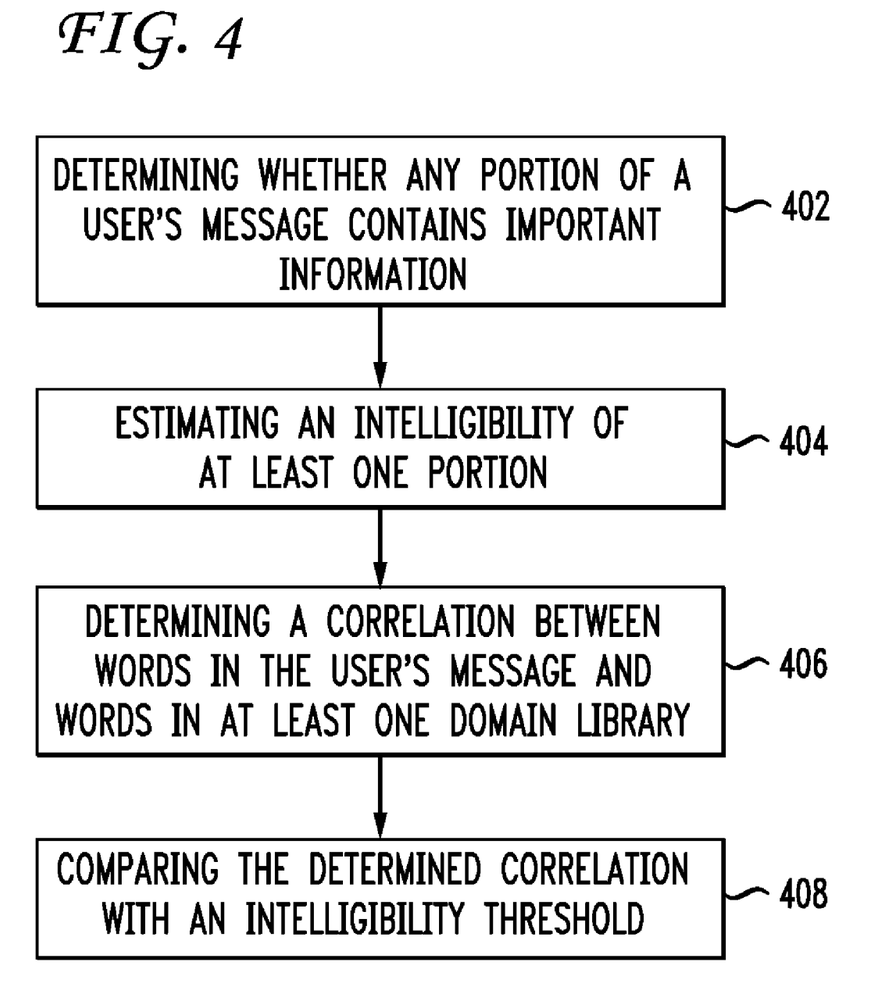

FIG. 4 illustrates several features discussed next. In an alternative embodiment of the present invention, the intelligibility monitor 250 may calculate an estimate of intelligibility based on the user's message containing critical or important information (402). Critical or important information may be, for example, names, bank account numbers, credit card numbers, telephone numbers, etc. that may be a critical portion of the user's message and need to be sufficiently intelligible when played back and/or processed by a human and/or a machine. The intelligibility monitor 250 may use known grammars and/or word spotting techniques to detect or identify words or segments of the user's message that may contain important and/or critical information.

If the intelligibility monitor 250 recognizes or identifies important information in the user's message, the intelligibility monitor 250 may calculate an estimate of intelligibility for the recognized important information (404). The calculated estimate of intelligibility may indicate the degree to which the important information is intelligible. The intelligibility monitor 250 may compare the calculated estimate of intelligibility for the recognized important information with an intelligibility threshold. In this case, the intelligibility threshold may indicate the minimum intelligibility level that may be desirable for the recognized important information to be sufficiently intelligible.

If the calculated estimate of intelligibility for the recognized important information is above the intelligibility threshold, the user's message may be considered potentially intelligible and may be forwarded to the output interface 290 for storage and/or processing. However, if the calculated estimate of intelligibility for the recognized important information is below the intelligibility threshold, the dialog manager 260 may begin a dialog with the user to repeat the entire message or a portion of the message. After the user repeats the message, the understandability monitor 280 may reevaluates the repeated message to determine intelligibility.

In a further alternative embodiment of the present invention, the intelligibility monitor 250 may employ one or more context-specific or domain-specific libraries or databases (not shown) to verify that the user's message contains words that match with the vocabulary words included in the domain-specific libraries or databases. In this embodiment, the intelligibility monitor 250 may establish an estimate of intelligibility (404) based on, for example, the number of words included in the user's message that appear in the vocabulary of the one or more domain-specific libraries.

In embodiments of the present invention, after receiving the user's message, the intelligibility monitor 250 may determine the domain of the user's message based on the words included in the user's message. The intelligibility monitor 250 may access the database of vocabulary words from the various context-specific or domain-specific libraries. As the user message is received, the intelligibility monitor 250 may attempt to determine the domain or domains of the message by determining the number of words from each of the domain vocabularies occur in the message. The intelligibility monitor 250 may determine the domain or domains of the message based on the predetermined or maximum number of words in that domain that occur in the message. For example, the intelligibility monitor 250 may be configured such that if four (4) words in the user's message appear in one or more of the domain libraries, then those domain libraries may be classified as the domain or domains of the message. The domain or domains of the message may be used to process the user's message. In alternative embodiments of the present invention, the domain of the message may be determined by prompting the user for information that may be used to specify the domain.

After the intelligibility monitor 250 determines the domain for the user's message, the intelligibility monitor 250 may access the one or more domain libraries (not shown) determined to be the domain of the user's message. The intelligibility monitor 250 may calculate an estimate of intelligibility (404) based on the number of words in the user's message that appear or correlate to terms in the one or more domain libraries (406). The calculated estimate of intelligibility may be compared to a domain-related intelligibility threshold (408). In this case, the domain-related intelligibility threshold may indicate the minimum number of words of the message that also occur in the one or more accessed domain-libraries for the message to be sufficiently intelligible.

If the calculated estimate of intelligibility based on the number of words that appear in the one or more accessed domain libraries is above the domain-related intelligibility threshold, then the user's message may be considered potentially intelligible and may be forwarded to the output interface 290 for storage and/or processing. However, if the calculated estimate of intelligibility based on the number of words that appear in the one or more accessed domain libraries is below the domain-related intelligibility threshold, then the dialog manager 260 may begin a dialog with the user to repeat the entire message or a portion of the message. After the user repeats the message, the understandability monitor 280 may reevaluate the repeated message to determine intelligibility.

The above techniques for determining whether a user's message is intelligible are given by example only and other methods may be used to determine whether the user's message is sufficiently intelligible.

If the understandability evaluator 280 determines that the user's message is potentially unintelligible, the understandability monitor may notify the dialog manager 260. The dialog manager 260 may engage in an interactive dialog with the user to repeat the entire or a portion of the user's message. The dialog manager 260 may prompt the user to repeat the message based on which measured and/or calculated value of the message is determined to be below its threshold value. For example, if the speech level is determined to be below its respective threshold, the dialog manager 260 may request the user to repeat the message with a higher volume. On the other hand, if the signal-to-noise ratio is determined to be below its respective value, the dialog manager 260 may request the user to hold the microphone closer to her mouth when repeating the message. As another example, if the estimate of intelligibility is determined to be below its respective threshold, the dialog manager may request the user to repeat the message slowly. It is recognized that the dialog manager 260 can engage in any number of specific dialogs to notify the user of the manner in which to repeat the message. In embodiments of the present invention, during the interactive dialog with the user, the dialog manager 260 may replay the unintelligible portion of the user's message so that the user may hear what the system determined to be unintelligible.

Figure 3:
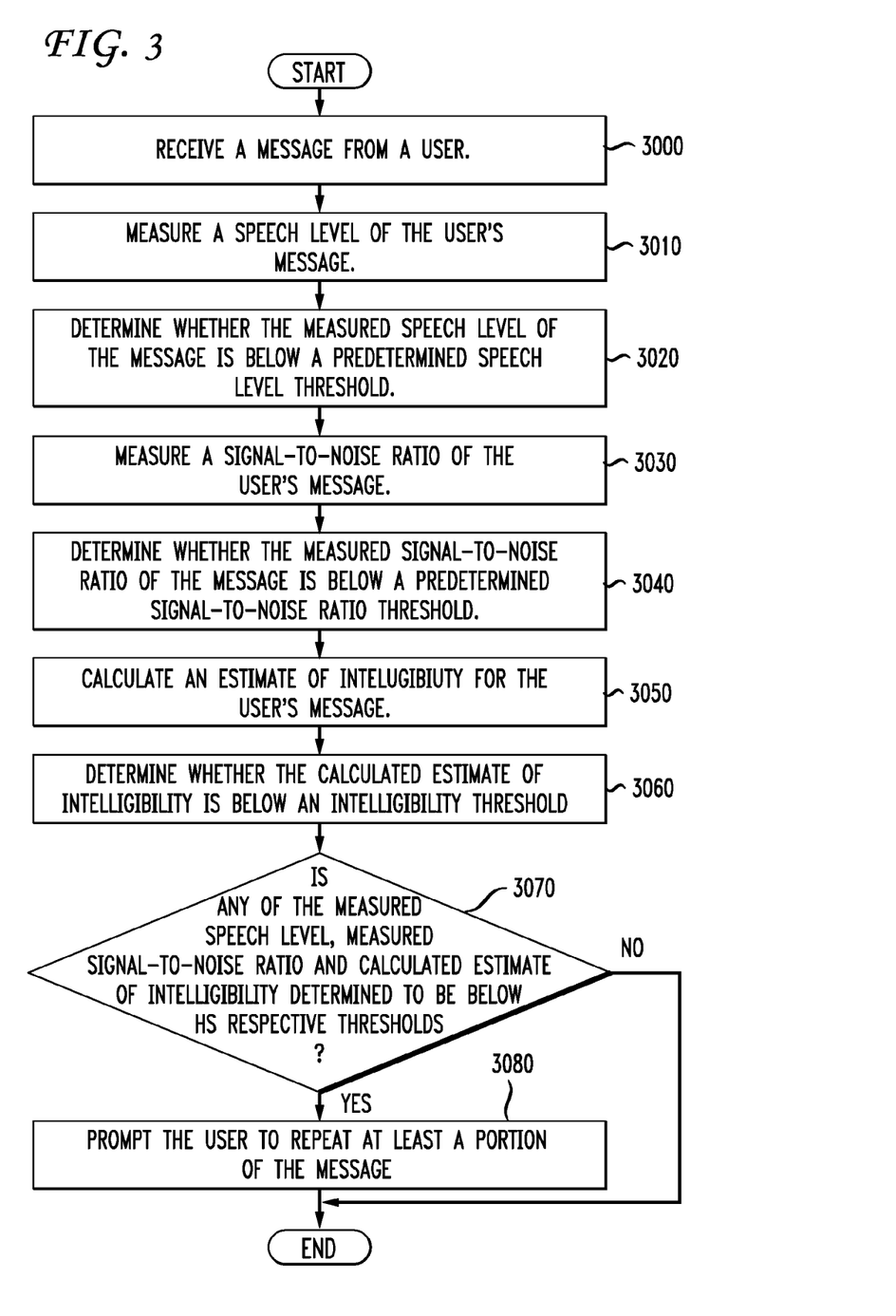
FIGS. 3 and 4 illustrates flowcharts showing speech verification methods in accordance with an exemplary embodiment of the present invention.

FIG. 3 is a flowchart illustrating an exemplary manner in which a user's messages may be verified for intelligibility according to an embodiment of the present invention. A user or calling party places a call to a called party's terminal device 160 using, for example, terminal device 110 (also referred to herein as called party 110). The call is received at the originating-side LEC 120 that may route the call through the transit network 130. Based on the dialed number, the call is received at, for example, the LEC 140. The LEC 140 further routes the call to the called party's terminal device 160 (also referred to herein as the called party 160). In this example, the called party 160 may be unavailable, thus an answering machine or service may pick up the call. After a greeting is played to the calling party 110, the calling party 110 is invited to leave a message for a called party 160.

As the calling party 110 is recording a message for the called party 160, the SVD 150 may monitor the message to verify that the recorded message is sufficiently intelligible. As indicated above, the SVD 150 may be coupled to one of the LECs or may be located internal to the terminal device 160. As the message for the called party 160 is being recorded by the answering machine or service, the message from the user is received by the SVD 150 and forwarded to understandability evaluator 280 (3000). The speech level monitor 230 of the understandability evaluator 280 may receive the message. The speech level monitor 230 may measure the speech level of the user's message (3010). The speech level monitor 230 may determine whether the measured speech level of the user's message is below a pre-determined speech level threshold (3020).

After the speech level monitor 230 processes the user's message, the signal-to-noise ratio monitor 240 receives the message. The signal-to-noise ratio monitor 240 may measure a signal-to-noise ratio for the user's message and determine whether the measured signal-to-noise ratio of the message is below a pre-determined signal-to-noise ratio threshold (3030-3040). After the signal-to-noise ratio monitor 240 processes the user's message, the message is forwarded to the intelligibility monitor 250 for processing.

The intelligibility monitor 250 receives the message and may calculate an estimate of intelligibility for the user's message (3050). The intelligibility monitor 250 may determine whether the calculated estimate of intelligibility is below an intelligibility threshold (3060).

In embodiments of the present invention, if the measured speech level, the measured signal-to-noise ratio, and/or the calculated estimate of intelligibility are determined to be below the respective thresholds, the dialog manager 260 may prompt the user to repeat the entire message or a portion of the message (3070-3080). Alternatively, if the measured speech level, the measured signal-to-noise ratio, and the calculated estimate of intelligibility are all determined to be above their respective thresholds, the process may end (3070). In embodiments of the present invention, after the process is completed, the user's message may be forwarded to the output interface 290 for storage and/or processing.

In alternative embodiments of the present invention, the understandability evaluator 280 may receive the measured speech level, the measured signal-to-noise ratio, and/or the calculated estimate of intelligibility and compare each to its respective threshold. The understandability evaluator 280 may evaluate the difference between the measured and/or calculated values and their respective thresholds and determine whether the user's message is intelligible or unintelligible. For example, the understandability evaluator may determine that even though one of the measured and/or calculated values is below its respective threshold, another of the measured and/or calculated values is well above its respective threshold and so the user's message should be classified as intelligible. It is recognized that the understandability evaluator 280 may perform other calculations and/or computations based on the measured and/or calculated values and/or their respective thresholds to determine whether the user's message is intelligible.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method for verifying that a message received from a user is intelligible, comprising:

measuring a speech level of a received user's message;

determining whether the measured speech level of the message is below a pre-determined speech level threshold;

measuring a signal-to-noise ratio of the user's message;

determining whether the measured signal-to-noise ratio of the message is below a pre-determined signal-to-noise ratio threshold;

calculating an estimate of intelligibility for the user's message;

determining whether the calculated estimate of intelligibility is below an intelligibility threshold by:

determining whether any portion of the user's message contains important information;

recognizing the portion of the user's message that contains the important information;

calculating the estimate of intelligibility for the recognized portion of the user's message that contains the important information, wherein the estimate of intelligibility indicates the degree to which the recognized important information is intelligible;

comparing the calculated estimate of intelligibility for the recognized portion of the user's message that contains the important information with the intelligibility threshold; and if the calculated estimate of intelligibility for the recognized portion of the user's message that contains the important information is below the intelligibility threshold, prompting the user to repeat the portion of the user's message determined to contain the important information; and prompting the user to repeat at least a portion of the message if any of the measured speech level, measured signal-to-noise ratio and calculated estimate of intelligibility of the user's message are determined to be below their respective thresholds.

2. The method of claim 1, wherein the important information contained in the user's message that is identified and recognized is one or more phonemes.

3. The method of claim 2, further comprising:
  combining the recognized phonemes into a single text string; and
  parsing the single text string into recognizable words.

4. The method of claim 2, wherein the one or more phonemes are from a complete set of phonemes that are expected for a particular language, the method further comprising:
  if one or more phonemes that are expected for the particular language are not recognized, accessing an extended set of phonemes, wherein the extended set of phonemes includes phonemes that are not found in the particular language;
  recognizing in the user's message one or more phonemes from the extended set of phonemes, wherein the estimate of intelligibility is calculated based on the recognized one or more phonemes from the extended set of phonemes;
  comparing the estimate of intelligibility calculated based on the recognized one or more phonemes from the extended set of phonemes with the intelligibility threshold; and
  if the estimate of intelligibility calculated based on the recognized one or more phonemes from the extended set of phonemes is below the intelligibility threshold, prompting the user to repeat at least the portion of the message.

5. The method of claim 4, further comprising:
  analyzing the phoneme distribution based on the recognized one or more phonemes from the extended set of phonemes; and
  based on the analyzed phoneme distribution, identifying which language is being spoken by the user.

6. A method for verifying that a message received from a user is intelligible, comprising:
  measuring a speech level of a received user's message;
  determining whether the measured speech level of the message is below a pre-determined speech level threshold;
  measuring a signal-to-noise ratio of the user's message;
  determining whether the measured signal-to-noise ratio of the message is below a pre-determined signal-to-noise ratio threshold;
  calculating an estimate of intelligibility for the user's message;
  determining whether the calculated estimate of intelligibility is below an intelligibility threshold by:
    determining a domain for the user's message;
    accessing a domain library from a plurality of domain libraries corresponding to the determined domain;
    calculating what percentage of words in the user's message correlate to words in the accessed domain library;
    comparing the calculated percentage of words in the user's message that correlate to words in the accessed domain library with the intelligibility threshold; and
    if the calculated percentage of words in the user's message that correlate to words in the accessed domain library is below the intelligibility threshold, prompting the user to repeat at least a portion of the message; and
  prompting the user to repeat at least a portion of the message if any of the measured speech level, measured signal-to-noise ratio and calculated estimate of intelligibility of the user's message are determined to be below their respective thresholds.

7. The method of claim 6, wherein determining the domain of the user's message comprises:
  recognizing the words included in the user's message;
  determining which of the plurality of domain libraries contains one or more of the recognized words; and
  selecting one or more domain libraries that contain the one or more of the recognized words.

8. The method of claim 6, wherein determining the domain of the user's message comprises:
  prompting the user for information relating to the domain of the user's message.

9. The method of claim 6, wherein the user's message is in English.

10. The method of claim 6, wherein the user's message is in a foreign language.

11. The method of claim 6, further comprising:
  if any of the measured speech level, measured signal-to-noise ratio and calculated estimate of intelligibility of the user's message are determined to be below their respective thresholds, replaying at least the portion of the message back to the user.

12. Apparatus for verifying that a message received from a user is intelligible, comprising:
  a receiver that receives the message from the user;
  a speech level monitor that measures a speech level of the user's message and that determines whether the measured speech level of the message is below a pre-determined speech level threshold;
  a signal-to-noise ratio monitor that measures a signal-to-noise ratio of the user's message and that determines whether the measured signal-to-noise ratio of the message is below a pre-determined signal-to-noise ratio threshold;
  an intelligibility monitor that calculates an estimate of intelligibility for the user's message and that determines whether the calculated estimate of intelligibility is below an intelligibility threshold by:
    determining whether any portion of the user's message contains important information;
    recognizing the portion of the user's message that contains the important information;
    calculating the estimate of intelligibility for the recognized portion of the user's message that contains the important information, wherein the estimate of intelligibility indicates the degree to which the recognized important information is intelligible;
    comparing the calculated estimate of intelligibility for the recognized portion of the user's message that contains the important information with the intelligibility threshold; and
    if the calculated estimate of intelligibility for the recognized portion of the user's message that contains the important information is below the intelligibility threshold, prompting the user to repeat the portion of the user's message determined to contain the important information; and
  a dialog manager that prompts the user to repeat at least a portion of the message if any of the measured speech level, measured signal-to-noise ratio, and calculated estimate of intelligibility of the user's message are determined to be below their respective thresholds.

13. The apparatus of claim 12, further comprising:
  an analog-to-digital converter that converts the user's message from an analog signal to a digitized signal that represents the user's message.

14. The apparatus of claim 12, further comprising:
an output interface that outputs the message if none of the measured speech level, measured signal-to-noise ratio and calculated estimate of intelligibility are determined to be below their respective thresholds.

15. A computer-readable memory having stored thereon a plurality of executable instructions, the plurality of instructions comprising instructions to:
receive the message from the user;
measure a speech level of the user's message;
determine whether the measured speech level of the message is below a pre-determined speech level threshold;
measure a signal-to-noise ratio of the user's message;
determine whether the measured signal-to-noise ratio of the message is below a pre-determined signal-to-noise ratio threshold;
calculate an estimate of intelligibility for the user's message;
determine whether the calculated estimate of intelligibility is below an intelligibility threshold:
determine whether any portion of the user's message contains important information;
recognize the portion of the user's message that contains the important information;
calculate the estimate of intelligibility for the recognized portion of the user's message that contains the important information, wherein the estimate of intelligibility indicates the degree to which the recognized important information is intelligible;
compare the calculated estimate of intelligibility for the recognized portion of the user's message that contains the important information with the intelligibility threshold; and
if the calculated estimate of intelligibility for the recognized portion of the user's message that contains the important information is below the intelligibility threshold, prompt the user to repeat the portion of the user's message determined to contain the important information; and
prompt the user to repeat at least a portion of the message if any of the measured speech level, measured signal-to-noise ratio and calculated estimate of intelligibility of the user's message are determined to be below their respective thresholds.

16. The computer-readable memory of claim 15, wherein the important information contained in the user's message that is identified and recognized is one or more phonemes.

17. The computer-readable memory of claim 16 having stored thereon additional executable instructions, the additional instructions comprising instructions to:
combine the recognized phonemes into a single text string; and
parse the single text string into recognizable words.

18. The computer-readable memory of claim 16, wherein the one or more phonemes are from a complete set of phonemes that are expected for a particular language, the computer-readable memory having stored thereon additional executable instructions, the additional instructions comprising instructions to:
if one or more phonemes that are expected for the particular language are not recognized, access an extended set of phonemes, wherein the extended set of phonemes includes phonemes that are not found in the particular language;
recognize in the user's message one or more phonemes from the extended set of phonemes, wherein the estimate of intelligibility is calculated based on the recognized one or more phonemes from the extended set of phonemes;
compare the estimate of intelligibility calculated based on the recognized one or more phonemes from the extended set of phonemes with the intelligibility threshold; and
if the estimate of intelligibility calculated based on the recognized one or more phonemes from the extended set of phonemes is below the intelligibility threshold, prompt the user to repeat at least the portion of the message.

19. The computer-readable memory of claim 18 having stored thereon additional executable instructions, the additional instructions comprising instructions to:
analyze the phoneme distribution based on the recognized one or more phonemes from the extended set of phonemes; and
based on the analyzed phoneme distribution, identify which language the user is speaking.

20. The computer-readable memory of claim 15 having stored thereon additional executable instructions, the additional instructions comprising instructions to: if any of the measured speech level, measured signal-to-noise ratio and calculated estimate of intelligibility of the user's message are determined to be below their respective thresholds, replay at least the portion of the message back to the user.

21. A computer-readable memory having stored thereon a plurality of executable instructions, the plurality of instructions comprising instructions to:
receive the message from the user;
measure a speech level of the user's message;
determine whether the measured speech level of the message is below a pre-determined speech level threshold;
measure a signal-to-noise ratio of the user's message;
determine whether the measured signal-to-noise ratio of the message is below a pre-determined signal-to-noise ratio threshold;
calculate an estimate of intelligibility for the user's message;
determine whether the calculated estimate of intelligibility is below an intelligibility threshold by:
determining a domain for the user's message;
accessing a domain library from a plurality of domain libraries corresponding to the determined domain;
calculating what percentage of words in the user's message correlate to words in the accessed domain library;
comparing the calculated percentage of words in the user's message that correlate to words in the accessed domain library with the intelligibility threshold; and
if the calculated percentage of words in the user's message that correlate to words in the accessed domain library is below the intelligibility threshold, prompting the user to repeat at least a portion of the message; and
prompt the user to repeat at least a portion of the message if any of the measured speech level measured signal-to-noise ratio and calculated estimate of intelligibility of the user's message are determined to be below their respective thresholds.

22. The computer-readable memory of claim 21 having stored thereon additional executable instructions, the additional instructions comprising instructions to:
  recognize the words included in the user's message;
  determine which of the plurality of domain libraries contains one or more of the recognized words; and
  select one or more domain libraries that contain the one or more of the recognized words.

23. The computer-readable memory of claim 21 having stored thereon additional executable instructions, the additional instructions comprising instructions to:
  prompt the user for information relating to the domain of the user's message.

\* \* \* \* \*